United States Patent

Tanaka

[11] Patent Number: 5,850,896
[45] Date of Patent: Dec. 22, 1998

[54] SHOCK ABSORBER

[75] Inventor: Akira Tanaka, Iwata, Japan

[73] Assignee: Yamaha Hatsudoki Kabushiki Kaisha, Iwata, Japan

[21] Appl. No.: 547,057

[22] Filed: Oct. 23, 1995

[30] Foreign Application Priority Data

Oct. 21, 1994 [JP] Japan .................................. 6-281534
Sep. 29, 1995 [JP] Japan .................................. 7-275061

[51] Int. Cl.⁶ .......................................................... F16F 5/00
[52] U.S. Cl. ................................... 188/266.2; 188/299.1
[58] Field of Search ................................ 188/299, 319, 188/322.15; 200/707, 714; 251/30.02, 44, 129.02

[56] References Cited

U.S. PATENT DOCUMENTS

| | | | |
|---|---|---|---|
| 3,477,466 | 11/1969 | Sturm .................................. | 251/30.02 |
| 5,085,299 | 2/1992 | Spiess et al. . | |
| 5,201,388 | 4/1993 | Malm . | |
| 5,303,804 | 4/1994 | Spiess .................................. | 188/299 |
| 5,501,307 | 3/1996 | Lars .................................. | 188/319 |

FOREIGN PATENT DOCUMENTS

| | | |
|---|---|---|
| 0364757 | 4/1990 | European Pat. Off. . |
| 0400395 | 12/1990 | European Pat. Off. . |
| 0440943 | 8/1991 | European Pat. Off. . |
| 0608427 | 8/1994 | European Pat. Off. . |
| 285535 | 3/1990 | Japan . |
| 2182514 | 7/1990 | Japan . |
| 34046 | 1/1991 | Japan . |

OTHER PUBLICATIONS

Patent Abstracts of Japan, vol. 940, No. 010 & JP-A-06 280921. European Search Report dated Feb. 23, 1996.

Primary Examiner—Robert J. Oberleitner
Assistant Examiner—Chris Schwartz
Attorney, Agent, or Firm—Knobbe, Martens, Olson & Bear LLP

[57] ABSTRACT

An electrically operated shock absorber that includes a pilot chamber and pilot valve which pilot valve is acted on by an electrical solenoid so as to control the damping characteristics of the shock absorber. An arrangement is provided for preventing total bumping of the pressure in the pilot chamber in the event of electrical failure and substituting a pressure responsive valve for controlling the damping characteristics when the electrical failure occurs. An improved piston construction and valving arrangement is also disclosed.

18 Claims, 5 Drawing Sheets

SHOCK ABSORBER

BACKGROUND OF THE INVENTION

This invention relates to a shock absorber and more particularly to an electrically controlled shock absorber and an improved fail-safe device for permitting said shock absorber to continue to function in the event of electrical failure.

There has been proposed a type of hydraulic shock absorber wherein the damping characteristics of the shock absorber may be varied by providing electrical control signals to the shock absorber. This type of shock absorber provides a valving arrangement in the piston of the hydraulic-type shock absorber which includes a control valve. The control valve controls flow between the two chambers defined in the hydraulic cylinder on the opposite sides of the piston. The control valve is subject to pressure in a pilot chamber, and the flow to this pilot chamber through the control valve is normally restricted. A pilot valve selectively dumps the pressure in the pilot chamber to a lower pressure area when the pressure in the pilot chamber reaches a preset value. This value is set by an electrical solenoid that acts on the pilot valve to hold it in a closed position. The set pressure may be varied to suit a desired control strategy for the suspension system in which the shock absorber is employed. Therefore, the opening of the main control valve will be controlled by the pressure in the pilot chamber and the damping characteristics thus controlled.

With this type of device, however, if there is an electrical failure, then the pilot valve will open, and the damping characteristics of the shock absorber will be substantially reduced or totally eliminated.

There has been proposed, therefore, a fail-safe type of device wherein a diaphragm-type valve is provided between the control valve and the pilot chamber, which will be maintained in a closed position by pressure in the event of an electrical failure. Damping characteristics are controlled by means of a small orifice or flow path across the diaphragm. Although this type of system does provide a fail-safe mode, it has certain areas where improvement would be desirable.

In the first instance, the trapping of pressure in the pilot chamber by the diaphragm valve causes the pressure in the pilot chamber to become elevated, and thus, if electrical power is restored, it will be difficult to again operate the pilot valve to move it to its closed position.

In addition, by relying upon an orifice as the damping medium, then variations in orifice size can adversely effect the desired damping characteristics. That is, there must be a high tolerance in the manufacturing of the orifice. Even if this is done, contamination of the orifice can significantly change its damping effect during its life.

It is, therefore, a principal object of this invention to provide an improved electrically controlled shock absorber wherein an improved fail-safe device is provided.

It is a further object of this invention to provide an improved electrically adjusted shock absorber wherein a fail-safe arrangement is provided and return to the normal operating mode upon the correction of the defect is facilitated.

It is a further object of this invention to provide an improved fail-safe device for an electrically controlled shock absorber wherein the damping in the fail-safe mode can be maintained at the desired value and the construction can be relatively low cost.

SUMMARY OF THE INVENTION

This invention is adapted to be embodied in an electrically controlled shock absorber that is comprised of a cylinder assembly in which a piston assembly is received to divide the cylinder assembly into a pair of spaced-apart piston fluid chambers. Means define a flow path between the piston fluid chambers, including a pressure-responsive control valve for controlling this flow path. The pressure-responsive control valve has a control portion that is subject to the pressure in a pilot chamber. An electrically controlled pilot valve controls the pressure at which the pilot valve can open to communicate the pilot chamber to a lower pressure area. This reduces the pressure in the pilot chamber and permits opening of the control valve when the pressure set is exceeded. A fail-safe arrangement is provided which closes the communication of the pilot chamber with the lower pressure area and which establishes another path to a low-pressure area in which a pressure-responsive valve is provided so as to control the pressure at which the flow from the pilot chamber may occur and hence the damping effect of the shock absorber.

DETAILED DESCRIPTION OF THE PREFERRED EMBODIMENTS OF THE INVENTION

Figure 1:
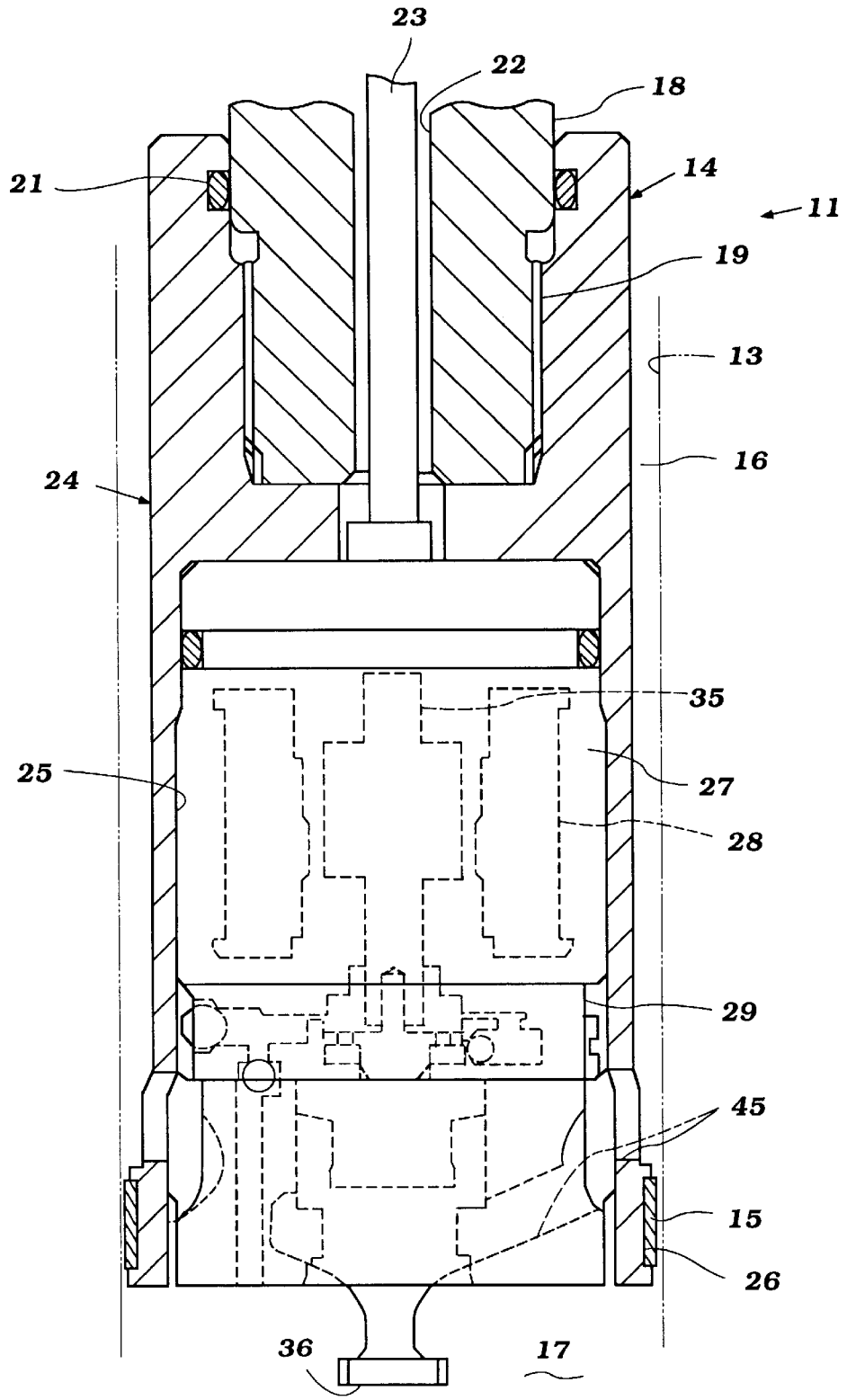
FIG. 1 is a cross-sectional view of the piston assembly of an electrically controlled hydraulic shock absorber constructed in accordance with a first embodiment of the invention, with the cylinder bore of the associated housing shown in phantom and with the valve mechanism shown in elevation.
Figure 2:
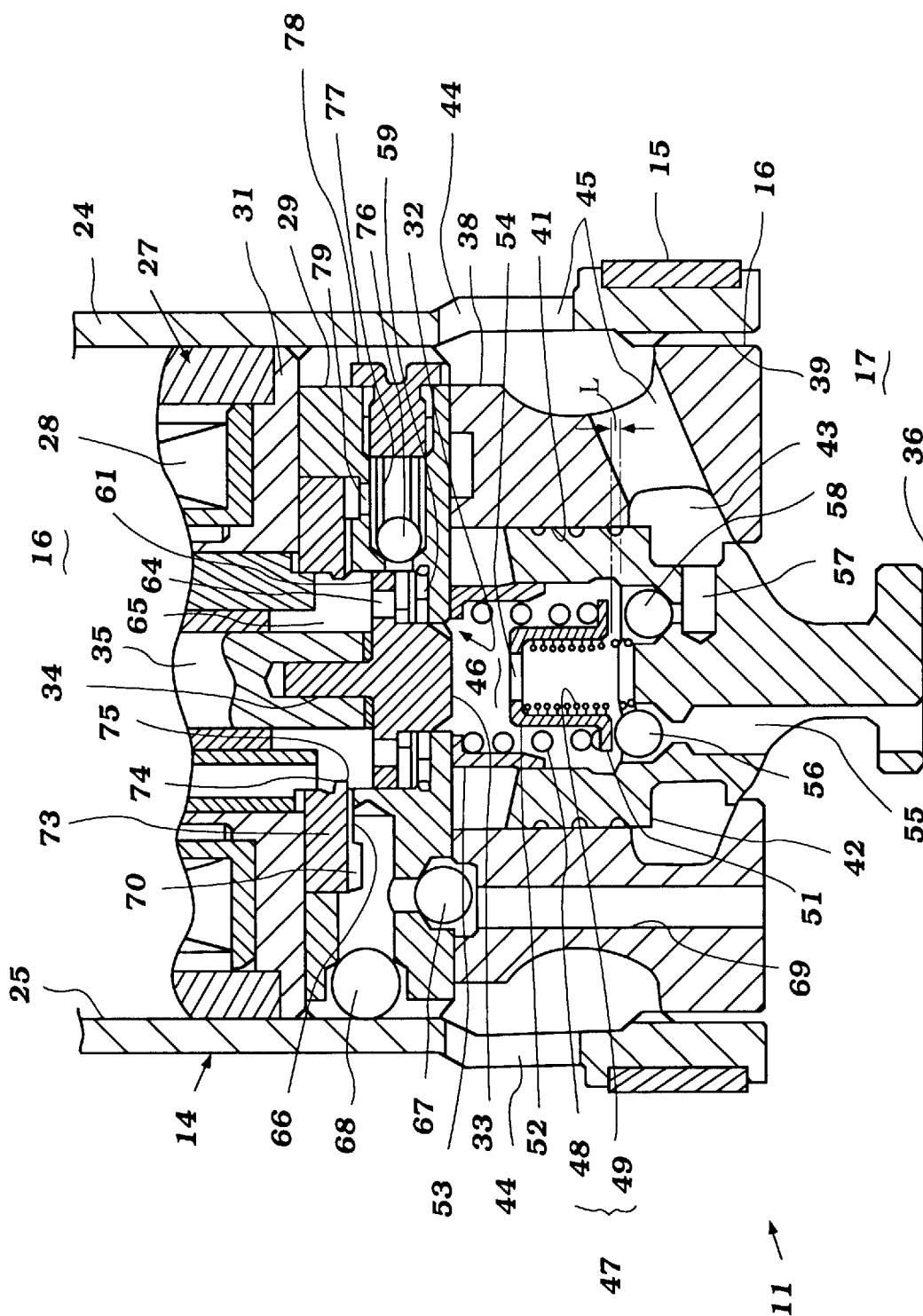
FIG. 2 is an enlarged cross-sectional view showing the valve mechanism of the shock absorber of this embodiment.

Referring now in detail to the drawings and to the embodiment of FIGS. 1–4 and initially primarily to FIGS. 1 and 2, an electrically controlled shock absorber constructed in accordance with a first embodiment of the invention is identified generally by the reference numeral 11. The shock absorber 11 is comprised of a cylinder, which does not appear in these figures but is illustrated later in the schematic views of FIGS. 3 and 4 and is indicated therein generally by the reference numeral 12.

The cylinder 12 has a cylinder bore 13, which does appear in FIG. 1. The cylinder 12 may be of any known type of construction and is filled with hydraulic fluid, as is well known in this art.

A piston assembly, indicated generally by the reference numeral 14, is supported in the cylinder bore 13 and has a sealing ring 15 at its lower end that is sealingly engaged with the cylinder bore 13 and defines an upper piston fluid chamber 16 and a lower piston fluid chamber 17. A damping arrangement, to be described, is contained with the piston assembly 14 and controls the flow between the chambers 16 and 17 to achieve the desired damping effect.

When installed in a vehicle or other arrangement wherein the shock absorber 11 will provide hydraulic damping for relative movement between two components, the cylinder 12 is affixed to one of these components. The piston 14 is affixed to the other component, and to this end a piston rod 18 is provided which has a threaded connection 19 to the piston 14. The piston rod 18 extends through a seal at the upper end of the piston chamber 16 for this purpose. An O-ring seal 21 provides an effective fluid-tight joint between the piston 14 and the piston rod 18.

The piston rod 18 is formed with a blind ended hollow interior, as at 22, through which an electrical conductor 23 passes for electrical control of the damping characteristics of the shock absorber 11 in a manner which will be described.

The piston 14 is comprised of a main body member, indicated by the reference numeral 24, and which has a hollow lower end 25 in which a number of subassemblies are received. The seal ring 15 is received in a groove 26 formed on the lower end of the body 24 and adjacent its open lower end.

The first of these subassemblies includes a solenoid housing, indicated generally by the reference numeral 27. This solenoid housing 27 is received in the innermost end of the piston cavity 25 adjacent its blind end and in abutting engagement therewith. The assembly 27 includes a solenoid coil or winding 28 that is suitably sealed within the solenoid housing 27 and which receives electrical power from the aforenoted conductor 23.

The winding 28 controls a pilot valve assembly, which is formed in part by the solenoid housing 27 and in further part by a subassembly consisting of an intermediate piston member 29 that is received in abutting relationship with an end plate 31 of the solenoid assembly which is affixed to the solenoid housing 27 in any appropriate manner.

The intermediate piston member 29 forms a pilot valve seat opening 32 which is valved by a pilot valve element 33. The pilot valve element 33 has a shank portion 34 that is received within an armature 35 of the armature assembly 27. The pilot valve 33 controls the opening of the valve seat 32 to provide certain flow paths, as will be described.

Finally, the remaining subassembly contained within the piston cavity 25 includes a main control valve 36. This main control valve 36 controls the flow through a control valve seat or port 37 formed in a lower piston member 38. The lower piston member 38 holds the intermediate piston member 29 and solenoid housing 27 in place via a threaded connection 39 to a female threaded opening at the lower portion of the outer piston cavity 25.

The lower piston member 38 is formed with a bore 41 in which a cylindrical portion 42 of the main control valve 36 is slidably supported. An annular area 43 is formed between the cylindrical portion 42 and the control valve seat 37. This chamber 43 is in communication with the upper piston fluid chamber 16 through ports 44 formed in the outer piston member 24 and through ports 45 formed in the lower piston member 38.

Obviously, the other side of the control valve seat 37 directly communicates with the piston fluid chamber 17. Accordingly, when the main control valve 36 moves away from the seat 37, open communication is provided between the piston fluid chambers 16 and 17.

The control valve cylindrical portion 42 is hollow and forms a pilot chamber 46. Received within this pilot chamber 46 is a spring assembly, indicated generally by the reference numeral 47 for adding a closing bias to the control valve 36. This biasing spring assembly 47 is comprised of a larger, stiffer and higher rate coil spring 48 and a smaller, lighter rate coil spring 49. The coil spring 48 is engaged at its lower end with a flange 51 of a hat-shaped spring retainer 52. The upper end of the spring 48 is engaged with a vibration isolating ring 53, which may be formed from a plastic or metal and which is urged into engagement with the piston intermediate member 29 around the pilot valve seat 32. The vibration insulating ring 53 is also slidably supported within the bore of the control piston cylindrical portion 42 that defines the pilot chamber 46.

The lighter spring 49 is contained within the hat-shaped retainer member 52 and engages its upper wall at one end and the control valve 36 at its lower end. A relatively large hole 54 is provided in the hat-shaped spring retainer member 53 so as to permit free fluid flow through it within the pilot chamber 46.

The normal position of the hat-shaped retainer 52 is shown in FIG. 2, and in this position its flange 51 is spaced a distance L from the lower end of the control valve member 36 that defines the pilot chamber 46. Thus the lighter spring 49 provides a relatively low bias on the control valve. After the control valve 36 moves the distance L the lighter spring 49 will deflect no more. At that time the flange 51 of the spring retainer 52 will be engaged by the control valve 36 and the heavier spring 48 will control further movement.

The pilot chamber 46 is also charged with fluid from either of the main piston chambers 17 or 16, depending upon which has the higher pressure to exert a closing pressure on the control portion of the control valve 36 which is positioned within the pilot chamber 46. To this end, the control valve 36 is provided with a first passage 55 in which a ball check valve 56 is provided. The ball check valve 56 permits flow through the passage 55 from the main piston chamber 17 to the pilot chamber 46 when there is a pressure differential there between, and when the piston fluid chamber 17 is at a higher pressure than the pilot chamber 46.

In addition, a second passage 57 extends through the control valve 36 from the area downstream of the control valve seat 37 and in communication with the recess 43. As previously noted, the recess 43 is in communication with the main piston chamber 16 through the passages 44 and 45 in the lower piston member 38 and the outer piston member 24, respectively. A ball-type check valve 58 permits flow from the recess 43 and passage 57 into the pilot chamber 46 when the main piston chamber 16 is at a higher pressure than the pilot chamber 46 and than the piston chamber 17. Therefore, and as has been noted, the pilot chamber 46 will normally experience the higher of the pressure in the main piston chambers 17 or 16.

It should be noted that the spring retainer element 52, and specifically its flange 51, provides a stop for each of the ball-type check valves 56 and 58.

It should be readily apparent that the pressure in the main piston chamber 17 acts on an area of the control valve 36 which is effectively equal to the diameter of the control valve seat 37. In a similar manner, the area in the main piston chamber 16 acts on the differential area of the control valve portion 36 less the effective area of the lower control valve portion or the diameter 37. Before the control valve 36 can open, either of these pressures must be greater than the pressure in the pilot chamber 46. The pressure in the pilot chamber 46 is controlled, as aforenoted, by the operation of the pilot valve 33. This construction will now be described.

It has been previously noted that the electrical coil 28, when activated, actuates the armature 35 to apply a downward pressure on the pilot valve 33. The pilot valve has a light plate-type spring 59 received between a disk shaped flange 61 thereof and an area adjacent a seating surface 62 around the pilot valve opening 32. This plate-type spring 59 has three or more fingers (not shown) bent from it that urge the pilot valve 33 upwardly away from seating engagement with the seat 62 so as to permit flow from the pilot chamber 46 in the event of electrical failure or in the absence for any reason of solenoid biasing force.

The flange 61 of the pilot valve is provided with a plurality of openings 64 so that when the pilot valve 33 is open, flow may pass through these openings to a chamber 65 formed on the back side of the pilot valve 33 within the inner piston member 29. This maintains substantially equal fluid pressure on the pilot valve when it is open.

Figure 3:
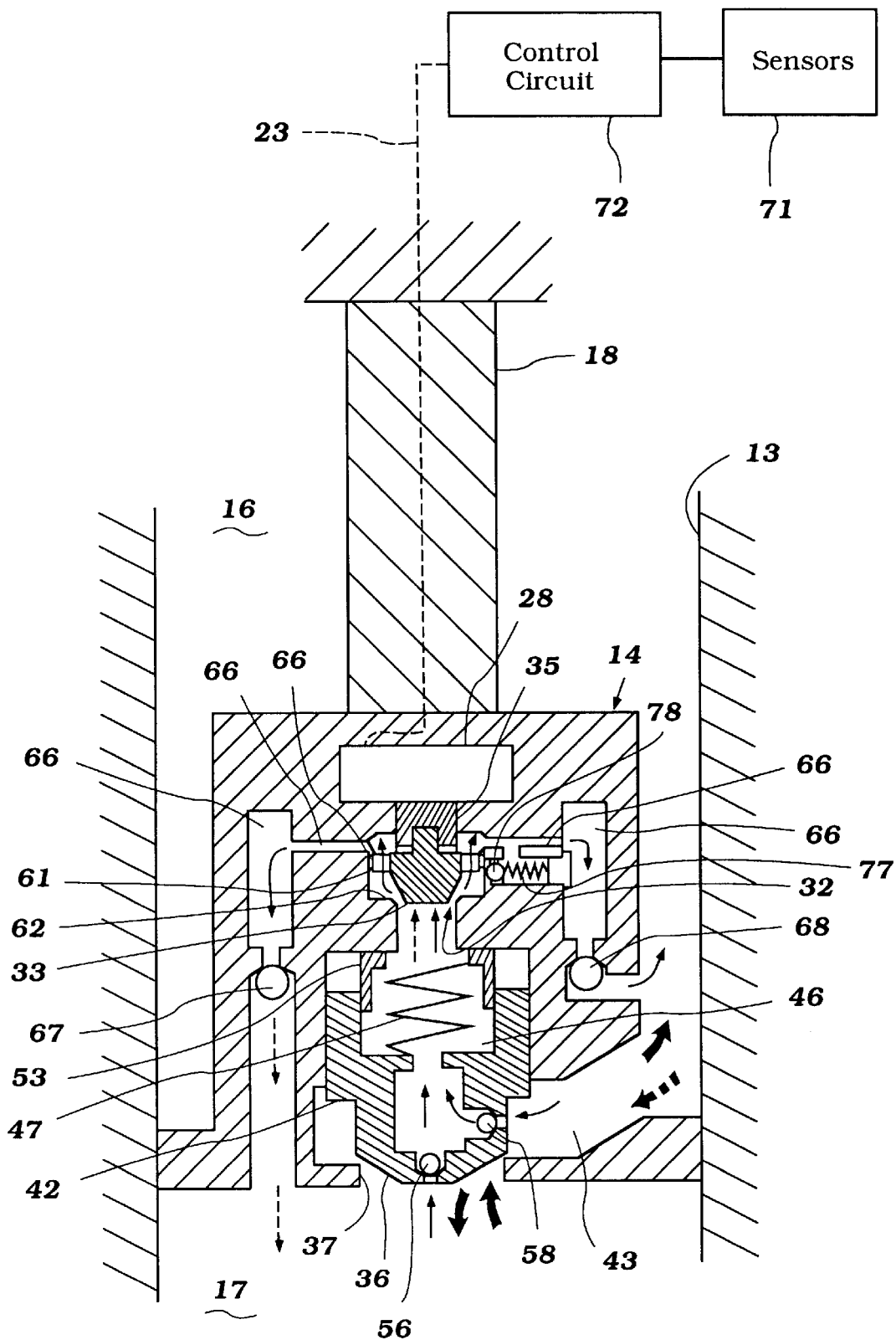
FIG. 3 is a schematic cross-sectional view showing the shock absorber of this embodiment in its normal operating mode.
Figure 4:
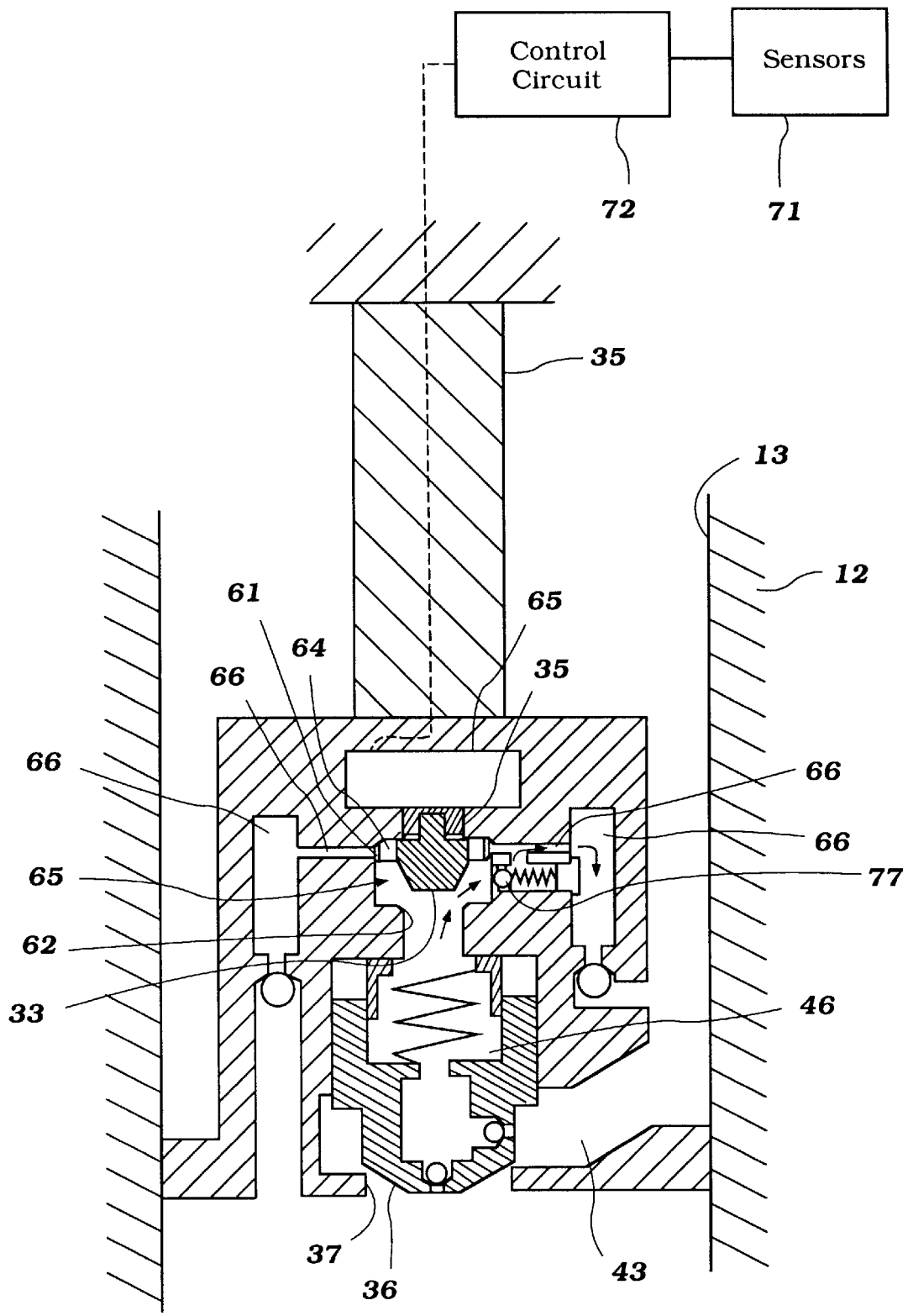
FIG. 4 is a schematic cross-sectional view, in part similar to FIG. 3, and shows the position in the fail-safe operational mode.

The chamber 65 normally communicates with two pilot passages 66 that extend radially outwardly through the intermediate piston member 29 to a pair of check valve passages in which check valves 67 and 68 are provided (see also FIGS. 3 and 4). The passages 66 are formed in part as slots in an annular projection 70 of a stopper plate 73, which will be described later. The check valves 67 and 68 are shown in same plane in FIG. 2 for illustration purposes only. They are actually spaced circumferentially from each other. The check valve 67, when opened, permits flow to the main piston chamber 17 through an axially extending passage 69 formed in the intermediate piston member 29 and the lower piston member 38. The check valve 68 when open permits flow from the pilot chamber 46 to the main piston chamber 16 through the passages 44 and 45.

Referring now additionally to FIG. 3, it has been noted that the armature winding or coil 28 is energized so as to control the pressure at which the pilot valve 33 will open. As shown schematically in this figure, there are provided one or more sensors 71 that sense various vehicle conditions. These sensors may be sensors that sense the speed of the associated vehicle, the relative positions of the piston 14 in the cylinder bore 13, and various other characteristics. These sensor outputs are transmitted to a control circuit 72 which is programmed with any desired control strategy so as to set the desired pressure at which the damper or shock absorber 11 will operate. Therefore, a control signal is transmitted through the conductor 23 to energize the winding 28 so as to set the preload on the pilot valve 33.

The operation during conventional damping will now be described by reference to FIG. 3. Assuming that the load is such that the piston 14 tends to move downwardly in the cylinder bore 13, the main piston chamber 17 will experience a higher pressure than the piston chamber 16. This higher pressure is transmitted through the check valve 56 to the pilot chamber 46. When the pressure in the pilot chamber 46 exceeds the pressure at which the pilot valve 33 is biased, the pilot valve 33 will open, as shown in FIG. 3, and flow will occur, as shown by the solid arrows in this figure.

If, on the other hand, the force is such that the piston 14 tends to move upwardly in the cylinder bore 13 and compress the fluid in the chamber 16 while relieving the pressure in the chamber 17, then flow occurs as shown in the broken arrows in this figure. In this condition the check valve 58 will open and permit the pressure in the chamber 16 to be transmitted to the pilot chamber 46 through the closed control valve 36.

Hence, when the pressure in either the piston fluid chambers 16 or 17 exceed the pressure in the pilot chamber 46 set by the force of the coil 28 through the armature 35 on the pilot valve 33 it will open. Thus pressure in the pilot chamber 46 will be dumped through opening of either the check valve 68 to permit flow to the main piston chamber 16 or the check valve 67 to permit flow to the piston chamber 17. This reduces the pressure holding the main control valve 36 in its closed position, and it will open, and thus permit flow through the control valve seat 38 between the piston chambers 16 and 17. The direction of flow will, of course, be from the higher pressure piston chamber to the lower pressure chamber.

As has been noted earlier, when either the check valve 56 or the check valve 58 opens, the initial upward movement of the main control valve 36 is resisted only by the relatively light coil spring 49 until the distance L has been traversed. Thereafter, the light spring will no longer be further compressed, since the control valve 36 will have contacted the shoulder 51 on the spring retainer. Further movement of the control valve 36 is resisted by the heavier spring 48, and therefore, the control valve motion 36 is smoother, and shocks and vibrations during control valve operation will be reduced or totally eliminated.

It should be readily apparent from the foregoing description that the construction is such that if there is an electrical failure and the winding 28 is not energized, the pilot valve 33 could open at very low pressures, and no shock absorbing or damping would result. Therefore, and in accordance with the invention, an arrangement is provided for effectively closing the communication of the pilot chamber 46 with the piston chambers 16 and 17 under this condition and interposing a check valve controlled flow path from the pilot chamber 46 to the lower pressure of the chamber 16 or 17. This setting of the check valve thus sets a fail-safe or default shock absorbing value for the shock absorber 11.

This structure will now be described by primary reference to FIG. 2, and its operation will later be described by reference to FIG. 4. It has been noted that the shoulder portion 61 of the pilot valve 33 is of such a size and such a shape that it can effectively close off the communication of the pilot chamber 46 with the passages 66. As has already been noted the plate type spring 59 urges the pilot valve 33 to this position when no biasing force is exerted on the pilot valve 33 by the armature 35 and coil 28.

In order to control the position of the pilot valve 33 and specifically its shoulder portion 61 under this condition, the intermediate piston portion 29 is provided with a stopper plate 73 that is held in place therein. This stopper plate 73 is provided with a restricted opening 74 formed around an inclined stop surface 75. This stop surface 75 will engage the back side of the shoulder 61 of the pilot valve 33 and hold it in a position where it will block communication with the passages 66. Therefore, the passages 66 are effectively shut off, and the pilot chamber 46 can no longer communicate through the passages 66 and check valves 67 or 68 with the chambers 17 or 16, respectively.

It should be noted that in this condition the shoulder openings 61 will maintain substantially equal pressure on opposite sides of the pilot valve 33. This facilitates unrestricted return to electrical control, when it is available.

The intermediate piston 29 is formed with a drilled passageway in which a ball-type safety check valve 76 is positioned. This check valve 76 is urged to a seated position by a coil compression spring 77 which has its preload adjusted by a set screw 78. This check valve 76 permits flow through a bypass passageway 79 which, in turn, communicates with the passageway 66 downstream of the ports blocked by the pilot valve shoulder 61.

Hence, when the electrical solenoid control fails, the pilot valve 33 will move to the position shown in FIG. 4, thus blocking the communication of the pilot chamber 46 directly with the passages 66. However, when sufficient force is exerted in either chamber 16 or 17, this same pressure will then act on the check valve 76. When the pressure exceeds the preload of the spring 77, the passageway 79 will be opened, and the pressure in the pilot chamber 46 thus relieved to set the pressure at which the main control valve 36 will open. The opening of the main control valve will be as previously described, depending upon whether the chamber 16 or 17 is at the higher pressure.

Therefore, the device operates so as to provide the safety damping, which is controlled not by the size of an orifice, but rather by the pressure on the check valve 76 set by the spring 77 and adjusting screw 78. The device operates so as to provide control damping, although at a fixed rate, in the event there is a failure of the electrical system.

If the electrical system is again restored, there will not be any high pressure differential acting on the pilot valve 33 that will resist its closure, as noted earlier. In addition because the inclined surface 75 of the stopper plate 73 contacts a relatively small surface of the shoulder 61 of the pilot valve 33 movement of the pilot valve 33 to its normal position will be facilitated.

Figure 5:
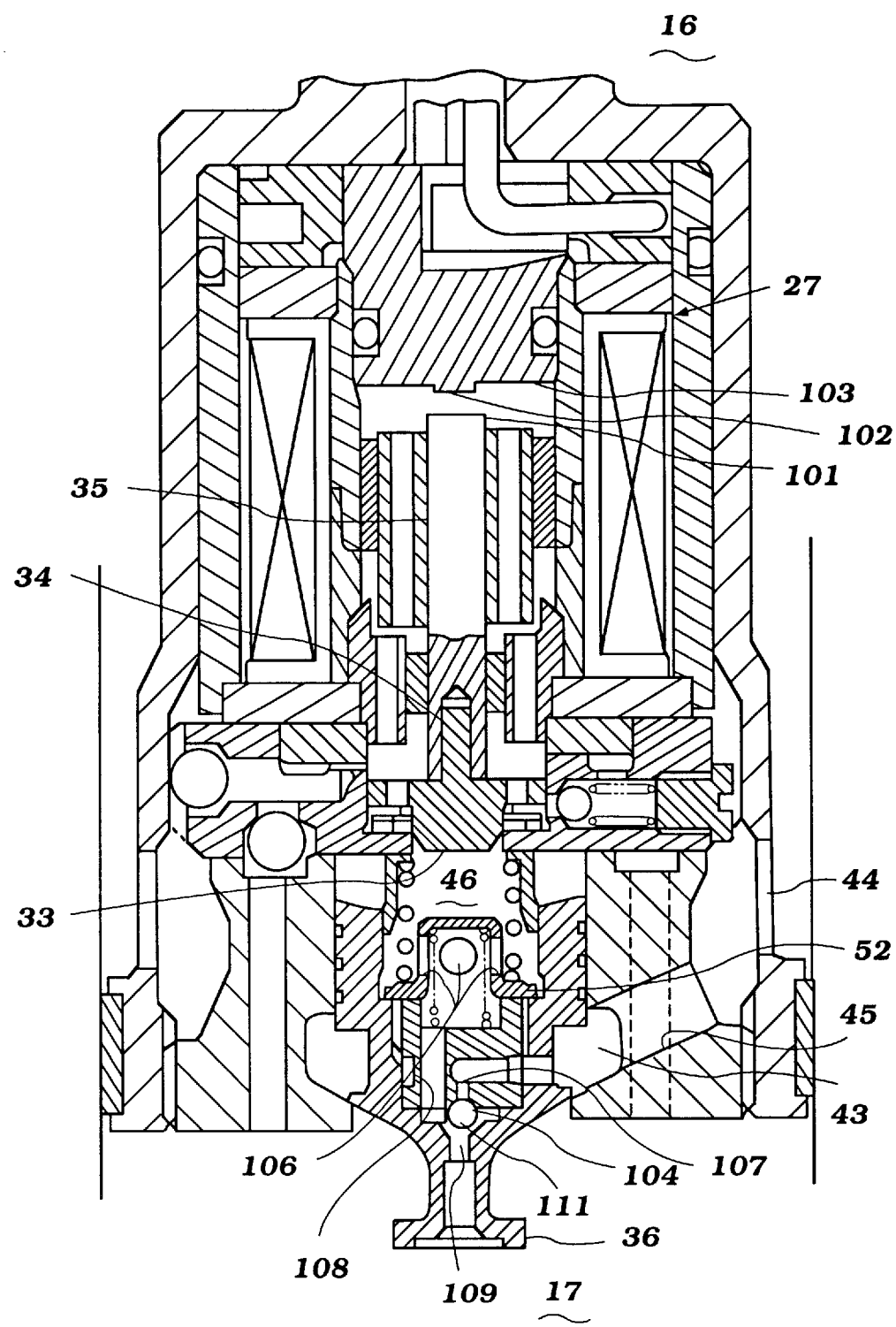
FIG. 5 is a cross-sectional view, in part similar to FIG. 2, showing a second embodiment of the invention.

FIG. 5 shows another embodiment of the invention which is generally similar to the embodiment of FIGS. 1 through 4. Where the components of this embodiment are the same or substantially the same as those of the previous embodiment, they have been identified by the same reference numerals and will be described again only insofar as is necessary to understand the construction and operation of this embodiment.

Basically, this embodiment differs from the previously described embodiment in two regards. The first of these deals with the manner in which the fail-safe position of the pilot valve 33 is determined. In the previously described embodiment, the pilot valve's movement upon failure of the solenoid 28 or electrical control circuit was determined by the stop surface 75 of the stop plate 73. Although this is effective, there are some possible difficulties with this construction and the embodiment of FIG. 5 eliminates those possible difficulties.

The first of these difficulties is that the actual stopping of the position of the pilot valve 33 is controlled by the valve itself rather than by the armature 35 associated therewith. In order to permit smooth movement, the shank portion 34 of the pilot valve 33 must have some clearance between it and the bore in the armature 35. Normally a diametrical clearance of 100~150 μm is provided. In addition, there must be a diametrical clearance between the disk shaped shoulder portion 61 and the receiving bore of the intermediate piston member 29. This diametrical clearance is normally about 100 υm. As a result, there is some diametrical play and it is at least 100 υm.

Since the surface 75 against which the pilot valve shows this portion 61 engages, there may be some cocking of the position of the pilot valve 33 in its fail-safe position. This cocking can provide some resistance to return movement when the electrical power is resumed. In addition, this cocking may reduce the effectiveness of the sealing of the passages 66 and thus there may be some inconsistency in the hydraulic operation.

In addition, the contacting stop surfaces are actually subjected to hydraulic pressure and this pressure can in some way interfere with the freedom of the seating elements to move away from each other. Of course, the construction of FIGS. 1 through 4 is substantially improved from the prior art type of arrangements wherein there was a full surface seating engagement which would provide a large hydraulic pressure locked area that could adversely affect return to automatic control once electrical power is restored. Also and as has been noted the construction reduces hydraulic pressure differentials.

In accordance with the embodiment of FIG. 5, the actual stop surfaces are moved away from the pilot valve element 33 itself and also are generally removed from the area where there is any significant hydraulic pressure or fluid. To this end, the armature 35 has an end portion 101 that extends up to and adjacent a stop projection 102 formed on an end plate 103 of the armature assembly 27. Hence, the contact between the end portion 101 and the stop projection 102 controls the closed fail-safe position of the pilot valve 33 and, accordingly, the aforenoted problems are avoided with this construction.

The other difference between the embodiment of FIG. 5 and the embodiments of FIGS. 1 through 4 is the check valve arrangement which permits the higher pressure of the piston chamber 16 or 17 to communicate with the pilot chamber 46. In the previously described embodiment, a first check valve 56 was positioned for controlling the flow through the passage 55 communicating the piston chamber 17 with the pilot chamber 46. A second check valve 58 was positioned in the passage 57 communicating the piston chamber 16 with the pilot chamber 46.

In this embodiment, a single check valve element comprised of a ball-type check valve 104 is provided for controlling the flow through a passageway 105 that communicates with the pilot chamber 46 through a plurality of cylindrical openings 106 formed in the hat-shaped spring retainer element 52. A first passageway 107 extends from the annular area 43 which communicates with the piston chamber 16 through the passages 45 and 44. The passageway 107 terminates at a first valve seat 108 which is valved by the ball check valve 104. When the ball check valve 104 is moved away from the seat 108 by a higher pressure in the piston chamber 16, flow to the pilot chamber 46 from the piston chamber 16 is accomplished through the aforenoted flow path.

The end of the control valve element 36 that extends into the piston chamber 17 is provided with an axially extending passageway 109 which is aligned with the valve seat 108 and which itself terminates in a second valve seat 111. The ball check valve 104 will close this valve seat 111 when the pressure in the piston chamber 16 is higher than the pressure in the piston chamber 17 as shown in the broken line view. However, when the pressure in the piston chamber 17 is higher than that in the piston chamber 16, the ball check valve 104 will move to the solid line position of FIG. 5 and, thus, the pressure in piston chamber 17 is communicated with the pilot chamber 46. At this time, the passage 107 would be closed.

Thus, from the foregoing description, it should be readily apparent that the described embodiments provide a very effective fail safe arrangement for an electrically controlled shock absorber. In each embodiment under a fail safe mode, the response of the shock absorber is controlled by the pressure responsive valve 76 which can have its opening pressure adjusted. It would be possible to also use in combination a pressure responsive valve and a fixed orifice. However and as has been noted above, the use of a fixed orifice can provide inconsistent results because of manufacturing variations and also because of subsequent contamination or deterioration in the orifice.

Also, the stopping arrangement for fixing the fail safe position of the pilot valve is such that the pilot valve can be quickly returned to normal operation without adverse hydraulic effects preventing such movement. In addition, the one embodiment of the invention provides a simplified check valve arrangement where the pilot chamber can communicate with either of the main piston chambers, depending upon which has the highest pressure.

Of course, the foregoing description is that of preferred embodiments of the invention and various other changes and modifications may be made without departing from the spirit and scope of the invention, as defined by the appended claims.

What is claimed is:

1. An electrically controlled shock absorber comprised of a cylinder assembly, a piston assembly received in said cylinder assembly and dividing said cylinder assembly into a pair of spaced apart piston fluid chambers, means defining a flow path between said piston fluid chambers including a pressure responsive control valve controlling such flow path, said pressure responsive control valve having a control portion subject to pressure in a pilot chamber for urging said pressure responsive control valve to a closed position, a pilot valve, an electric solenoid for controlling the pressure at which said pilot valve opens for communicating said pilot chamber with a lower pressure area for reducing the pressure in said pilot chamber holding said control valve in its closed position, a fail safe arrangement for closing the communication of said pilot chamber with said lower pressure area and establishing another path to a low pressure area, a pressure responsive valve in said another path for controlling the pressure in said pilot chamber and the pressure at which the pressure in said pilot chamber can be relieved through said another path, said pilot valve being comprised of a first portion cooperable with a pilot valve seat for controlling the opening and closing of the communication of said pilot chamber with said lower pressure area a second portion for closing the communication of said pilot chamber with the lower pressure area and wherein movement of the pilot valve in one direction causes said first portion to close said pilot valve seat before the second portion closes the communication of the pilot chamber with the lower pressure area, and positive stop means for limiting the movement of the pilot valve in the one direction upon the failure of electric power, said positive stop means being disposed in an area spaced from said pilot valve first and second portions in an area that does not experience the flow between the piston fluid chambers in any condition of the pilot valve.

2. An electrically controlled shock absorber as set forth in claim 1 wherein the electric solenoid includes an electrically actuated armature associated with the pilot valve for resisting movement of the pilot valve in the one direction.

3. An electrically controlled shock absorber as set forth in claim 2 wherein the positive stop is provided in part by the armature.

4. An electrically controlled shock absorber as set forth in claim 3 wherein the flow path and pilot chamber are formed in the piston assembly and the pilot valve and control valve are movably supported by the piston assembly and form portions thereof.

5. An electrically controlled shock absorber comprised of a cylinder assembly, a piston assembly received in said cylinder assembly and dividing said cylinder assembly into a pair of spaced part piston fluid chambers, means defining a flow path between said piston fluid chambers including a pressure responsive control valve for controlling such flow path, said pressure responsive control valve having a control portion subject to pressure in a pilot chamber for urging said pressure responsive control to a closed position, a pilot valve, an electric solenoid for controlling the pressure at which said pilot valve opens for communicating said pilot chamber with a lower pressure area for reducing the pressure in said pilot chamber holding said control valve in its closed position, positive stop means for limiting the opening movement of the pilot valve upon the failure of electric power, said positive stop means being provided in the area between said pilot chamber and said lower pressure area and being formed in part by said pilot valve and by an inclined stop surface engaged by said pilot valve, and a fail safe arrangement for closing the communication of said pilot chamber with said lower pressure area and establishing another path to a low pressure in said pilot chamber and the pressure at which the pressure in said pilot chamber can be relieved through said another path, said piston assembly includes a generally hollow piston member closed at one end by an integral wall and closed at its other end by a subassembly comprised of a lower piston member forming said pressure responsive control valve consisting of a valve seat for communicating said piston chambers with each other and a bore slidably supporting a control valve element having a portion engageable with said valve seat for controlling the flow therethrough, said control valve element being formed with an integral bore forming in part the pilot chamber and further including passage means for selectively communicating said piston chambers with said pilot chamber including pressure responsive check valve means for permitting only the higher of the pressure in the piston chambers to communicate with the pilot chamber.

6. An electrically controlled shock absorber as set forth in claim 5 wherein the pilot valve is comprised of a first portion cooperable with a pilot valve seat for controlling the opening and closing of the communication of the pilot chamber with the lower pressure area and a second portion for closing the communication of said pilot chamber with the lower pressure area and wherein movement of the pilot valve in one direction causes said first portion to open said pilot valve seat before the second portion closes the communication of the pilot chamber with the lower pressure area.

7. An electrically controlled shock absorber as set forth in claim 6 further including positive stop means for limiting the movement of the pilot valve in its second position upon the failure of electric power.

8. An electrically controlled shock absorber as set forth in claim 7 wherein the positive stop means is provided in the area between the pilot chamber and the lower pressure area.

9. An electrically controlled shock absorber as set forth in claim 8 wherein the positive stop means is formed in part by the pilot valve.

10. An electrically controlled shock absorber as set forth in claim 9 wherein the pilot valve engages an inclined stop surface for providing the positive stop means.

11. An electrically controlled shock absorber as set forth in claim 6 wherein the positive stop means is disposed out of the flow path between the pilot chamber and the lower pressure area.

12. An electrically controlled shock absorber as set forth in claim 11 wherein the electric solenoid includes an electrically actuated armature associated with the pilot valve for resisting movement of the pilot valve in the first direction.

13. An electrically controlled shock absorber as set forth in claim 12 wherein the positive stop is provided in part by the armature.

14. An electrically controlled shock absorber as set forth in claim 6 wherein the piston assembly includes an intermediate member having a lower portion defining in part the pilot chamber and the pilot valve seat with which a portion of the pilot valve cooperates for controlling the communication of the pilot chamber with the lower pressure area, said intermediate member defining a bore in which a disc shaped portion of said pilot valve reciprocates, said intermediate member defining a flow path between said pilot chamber and said lower pressure area, said disc shaped portion of said pilot valve be movable into a position for closing said path upon movement of said pilot valve by more than a predetermined amount and positive stop means for limiting the movement of said pilot valve to said predetermined position upon the failure of the electrical power.

15. An electrically controlled shock absorber as set forth in claim 14 wherein the pressure responsive valve is supported in the intermediate piston member and controls a passage that intersects the bore in which the disc shaped portion of the pilot valve is movable and which is disposed adjacent the pilot valve seat and which is continuous communication with the bore regardless of the position of the disc shaped portion of said pilot valve.

16. An electrically controlled shock absorber as set forth in claim 15 wherein the pressure responsive valve comprises a ball type valve and further including an adjustable biasing spring for adjusting the pressure in which said ball type valve opens.

17. An electrically controlled shock absorber as set forth in claim 5 wherein the passage means and the pressure responsive check valve means comprises first and second passages each communicating a respective one of the piston chambers with the pilot chamber and a check valve in each passage permitting flow only from the respective piston chamber to the pilot chamber.

18. An electrically controlled shock absorber as set forth in claim 5 wherein the pressure responsive valve comprises a single valve body having two oppositely acting check valve elements.

* * * * *

UNITED STATES PATENT AND TRADEMARK OFFICE
CERTIFICATE OF CORRECTION

PATENT NO.    : 5,850,896
DATED         : December 22, 1998
INVENTOR(S)   : Akira Tanaka It is certified that error appears in the above-identified patent and that said Letters Patent is hereby corrected as shown below:

Column 9,
Line 38, please change "to close" to -- to open --.

Signed and Sealed this

Twenty-ninth Day of October, 2002

Attest:

Attesting Officer

JAMES E. ROGAN
Director of the United States Patent and Trademark Office